No. 841,907. PATENTED JAN. 22, 1907.
J. P. THORN.
CLOTHES LINE REEL.
APPLICATION FILED MAY 18, 1905.

WITNESSES
E. G. Ahlberg
Max Stengel

INVENTOR
John P. Thorn
By Robt. Klotz
Atty

UNITED STATES PATENT OFFICE.

JOHN PIETER THORN, OF CHICAGO, ILLINOIS.

CLOTHES-LINE REEL.

No. 841,907. Specification of Letters Patent. Patented Jan. 22, 1907.

Application filed May 18, 1905. Serial No. 260,945.

*To all whom it may concern:*

Be it known that I, JOHN PIETER THORN, a citizen of the United States, residing at Chicago, in the county of Cook and State of Illinois, have invented new and useful Improvements in Clothes-Line Reels, of which the following is a specification.

My invention relates to reels, and particularly to that class known as "clothes-line" reels.

The object of my invention is to provide a reel having means for permitting the line wound thereon to shrink should it accidentally become dampened after being wound on the reel.

Furthermore, the object of the invention is to provide a reel having a resilient central body portion on which the line is wound, so that the line may contract should it become wet, and thus prevent the breaking of the strands of the line.

Finally, the object of the invention is to furnish a cheap and simple reel around which a clothes-line, fishing-line, or plump-bob line can be readily and compactly wound when not in use.

With the above and other objects in view the invention consists in the arrangement and combination of parts to be hereinafter more fully set forth, and particularly pointed out in the claims.

In order to enable others skilled in the art to which my invention appertains to make and use the same, I will now proceed to describe its construction and operation, referring to the accompanying drawings, which form a part of this specification, and in which—

Figure 1:
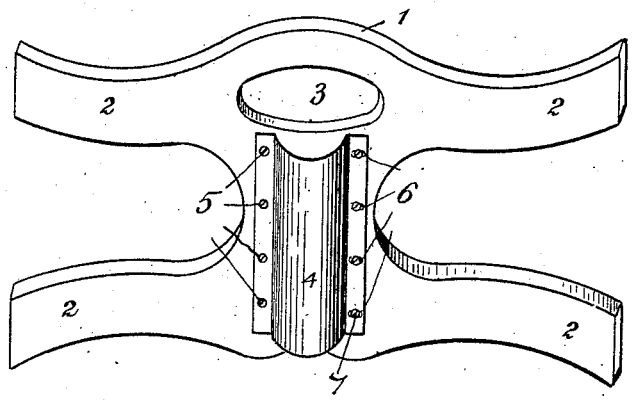
Figure 2:
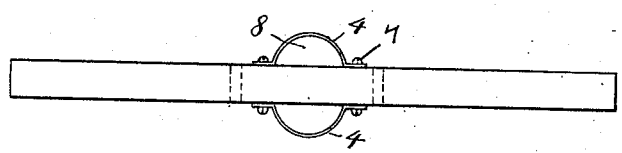

Figure 1 is a perspective view of my improved reel, and Fig. 2 is a top plan view thereof.

In the drawings, 1 indicates the central or body portion of the reel, having radial extending arms 2 2 2 2 and provided at one side with an oval-shaped opening 3 to provide a handhold.

I secure on each side of the body portion a semicylindrical resilient plate 4. The plates are rigidly secured to the body of the reel on one edge by any suitable means, preferably screws 5, and the opposite edges of the plates are formed with elongated slots 6, in the center of which screws 7 are secured to the body of the reel. The semicylindrical plates are secured to the body portion 1 of the reel substantially at right angles with the arms 2. An opening or passage 8 is provided under the plates in which one end of the line may be inserted and a knot tied on the line in order that the line may not accidentally become disengaged from the reel.

In the operation of my device the line is attached to the reel in the manner above described and is then wound over the central or body portion of the reel and the semicylindrical plates. The plates, by means of their yielding connection with the reel-body, are allowed a certain freedom of movement, and accordingly contract or expand to the shrinkage or contraction of the line on the reel.

The construction, operation, and advantages will, it is thought, be understood from the foregoing description, it being noted that various changes may be made in the proportions and details of construction without departing from the scope of the invention.

Having fully described my invention, what I claim as new, and desire to secure by Letters Patent, is—

1. In a clothes-line reel, a body portion provided with radial extending arms, semicylindrical resilient plates each rigidly secured at one edge to said body portion and loosely secured thereto at its opposite edge, substantially as described.

2. In a clothes-line reel, a body portion having radial extending arms, semicylindrical resilient plates each provided with elongated slots in one side edge and rigidly secured to the body portion by its opposite edge, and fastening means passing through the slots.

In testimony whereof I affix my signature in presence of two subscribing witnesses.

JOHN PIETER THORN.

Witnesses:
J. H. FAWELL,
JONAS O. LUNDE.